United States Patent [19]

Ooba et al.

[11] 3,857,799

[45] Dec. 31, 1974

[54] PROCESS FOR THE REGENERATION OF PLASTICS

[75] Inventors: Seiichi Ooba, Asaka; Shinichi Hirayama, Fukuyama, both of Japan

[73] Assignee: Fuji Photo Film Co., Ltd., Kanagawa, Japan

[22] Filed: Feb. 25, 1972

[21] Appl. No.: 229,501

[30] Foreign Application Priority Data

Feb. 25, 1971 Japan................................ 46-9483

[52] U.S. Cl.................. 260/2.3, 260/16, 260/17 R, 260/40 R, 260/873, 260/897 R, 260/901
[51] Int. Cl... C08f 47/24, C08g 53/22, C08b 29/40
[58] Field of Search.................... 260/2.3, 2.5 N, 873

[56] References Cited
UNITED STATES PATENTS

| | | | |
|---|---|---|---|
| 3,210,301 | 10/1965 | White................................ | 260/2.3 |
| 3,386,925 | 6/1968 | Dillhoefer........................... | 260/2.3 |
| 3,406,127 | 10/1968 | Alexander........................... | 260/2.3 |
| 3,652,467 | 3/1972 | Bunk et al.......................... | 260/2.3 |

FOREIGN PATENTS OR APPLICATIONS 43-20313    8/1968    Japan

*Primary Examiner*—Wilbert J. Briggs, Sr.
*Attorney, Agent, or Firm*—Sughrue, Rothwell, Mion, Zinn & Macpeak

[57] ABSTRACT

The process for regenerating waste plastics by mixing the waste plastics with an ether-type polyester and at least one member selected from the group consisting of a homopolymer of vinyl acetate, an ethylenevinyl acetate copolymer or a tacky polyolefin; and if necessary a foaming agent, and then molding the mixture into a desired shape.

15 Claims, No Drawings

PROCESS FOR THE REGENERATION OF PLASTICS

BACKGROUND OF THE INVENTION

1. Field of the Invention

The present invention relates to a process for regenerating waste plastics. More specifically, the invention relates to an improved process for regenerating and utilizing waste plastics.

2. Description of the Prior Art

Recently, plastics, for instance, a thermoplastic resin such as a polyolefin type resin or a polystyrene type resin and a thermo-setting resin such as a urea type resin, a melamine type resin, or a phenol type resin have been utilized in various fields as moldings such as vessels, fibers, films, sponges, etc., and the production amounts required have increased remarkably.

These moldings are wasted after use but the disposal of the waste plastics is a great trouble in every field. That is to say, as the most common disposal method, the waste plastics are burned, but in this case injurious gases are formed and also heat and smoke are generated as well as the fact such a disposal requires an expensive burning furnace.

A disposal of waste plastics without the necessity of burning has been proposed. That is to say, the recovery and regeneration have been attempted for a polyvinyl chloride film or a polyethylene film used as a substantially single article and for a single use, e.g., used as an agricultural house, but in many cases the polyvinyl chloride is mutually intermingled with polyethylene and thus it is quite difficult to separate them owing to the immiscibility of them. Therefore, the economical regeneration of them has not succeeded. Also, in the field of polyvinyl chloride leather, a method is known in which such a leather with a backing cloth is treated with concentrated sulfuric acid under heating to dissolve away the cloth and after washing with water, the remaining polyvinyl chloride is recovered. However, since such a process is difficult from an economic point of view and further since such a process is accompanied with a problem of water pollution from the sulfuric acid-containing waste solution such a process has not been practically employed.

Another important problem encountered in the regeneration and utilization processes without the necessity of a burning operation is that such plastics contain small amounts of organic and inorganic materials and even if each plastic can be separated, such foreign matters are intermingled inevitably in the plastic recovered.

An object of this invention is, therefore, to provide a process for chemically treating waste plastics and economically regenerating the plastics without causing the problem of water pollution.

The above object of this invention is attained by crushing the waste plastics without separating them from each other, blending the crushed plastics with adhesives, and after blending further, if necessary, a foaming agent therewith, molding the mixture according to the desired purposes.

The important feature of this invention is in the point of using the two kinds of compounds (a) and (b) shown below.

That is to say: (a) an ether-type polyester prepared by heating a mixture of polyethylene terephthalate and at least one kind of glycol other than ethylene glycol to substitute the ethylene glycol units in the polyethylene terephthalate with the glycol; and (b) at least one member selected from the group consisting of a vinyl acetate homopolymer, an ethylene-vinyl acetate copolymer, and tacky polyolefins.

The above ether-type polyesters (a) can be prepared by gradually adding the polyethylene terephthalate to one or more of the glycols and gradually heating the mixture in a flowing dry nitrogen atmosphere. The polymer is gradually dissolved in the glycol or glycols or is dispersed therein after the temperature of the mixture has reached the melting point of the polymer. The reaction temperature is normally the boiling point of the glycol or glycols or in the vicinity thereof, and is preferably about 200°–260°C. A catalyst may be used although it is not necessary, the catalyst being those catalysts which are generally used in the synthesis of polyethylene terephthalate such as an alkali metal, an alkaline earth metal or derivatives thereof. In effect, an ester interchange reaction takes place between the glycol and the polyethylene terephthalate wherein the ethylene glycol components in the polyethylene terephthalate molecule are substituted by the other glycol. Thereafter, the substituted ethylene glycol may be distilled out from the mixture and removed therefrom. The reaction is carried out for about 2–20 hours and the properties of the resulting product vary depending upon the time of reaction. Generally, the reaction period preferably is 6–10 hours. At the end of the reaction, when it is complete, the system is kept under a vacuum at the final reaction temperature in order to remove the excess glycol and the formed ethylene glycol. The adhesive property of the resulting product depends upon the content of the raw materials used and the amount of the glycol which is substituted for the ethylene glycol units of the polyethylene terephalate. Generally, from about 30 to 100 percent of the ethylene glycol components of the polyethylene terephthalate are substituted by the other glycol.

Such ether-type polyesters have sufficient adhesive properties not only for various inorganic materials but also for polyolefins and specific synthetic rubbers that have hitherto been believed to show poor adhesive properties to polyesters. The component (b) used together with the ether-type polyester also has an adhesive property and by using the component together with the ether-type polyester, the adhesive effect thereof can be further increased. The practical examples of the components (b) are an emulsion of a vinyl acetate homopolymer, an emulsion or a solution of an ethylene-vinyl acetate copolymer, and a tacky polyolefin such as a polyolefin having a low polymerization degree or atactic polypropylene.

Besides the component (b) mentioned above, cross-linkable adhesives such as urea type resins or melamine type resins may be used if necessary.

When a foaming agent is used in this invention, every foaming agent conventionally known may be used without any restriction.

Glycols other than ethylene glycol are used in this invention, e.g., polymethylene glycols [$HO(CH_2)_nOH$, $n=3-20$], such as trimethylene glycol, tetramethylene glycol, pentamethylene glycol, hexamethylene glycol, and the like; polyethylene glycols [$HO(CH_2CH_2O)_nOH$, $n=2-100$], such as diethylene glycol, triethylene glycol, and the like; alkylene glycols, such as propylene glycol, butylene glycol, neopentyl glycol, hexylene glycol, octylene glycol, cyclohexane-1, 4-dimethanol, and the like; or compounds having aromatic groups between two hydroxyl groups, such as compounds of the following formulas, and the like, can be used.

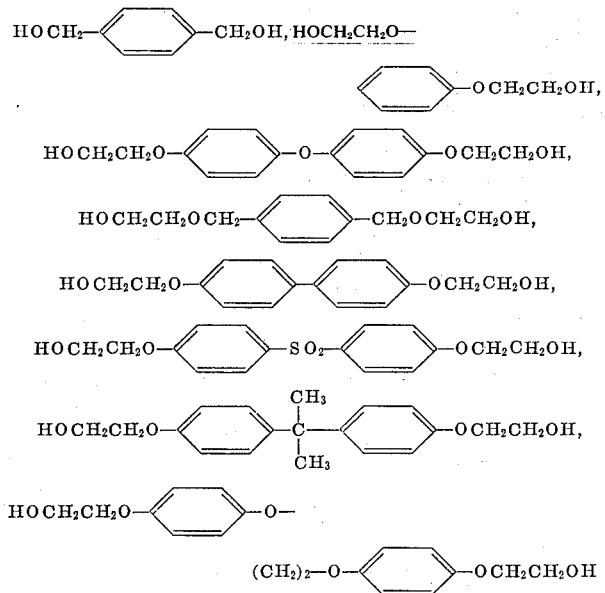

By utilizing the adhesive property, the component (a) and the component (b) are sufficiently dispersed in crushed plastic waste which may contain inorganic matters to some extent by a solvent method, a powder mixing method, etc., according to the apparent mixing ratio, the mixture is dried, and after being aggregated by melting them to some extent if necessary, molded into a solid article, a foamed article, a sheet, a board, or a laminate by means of heat molding, rolling, lamination, etc. Of course, in this case a thermo-foaming agent such as sodium carbonate may be incorporated in the mixture to provide a hard material or a heat insulating material.

The plastic wastes used in this invention include shaped articles such as vessels which are crushed in the practice of this invention and also fine wastes such as waste fibers which can be used without the necessity of a crushing operation.

According to the process of this invention waste plastics are all recovered and further they are regenerated for reuse and accordingly not only are the troubles caused by such wastes removed but also plastic articles are produced from such wastes with a low cost. Moreover, because a burning operation is not employed in this invention, the practice of the process of this invention does not suffer from the formation of noxious gases or smoke. Thus, the process of this invention is quite a significant industrial process.

Hereinafter, the invention will be more specifically described by referring to the following examples.

EXAMPLE 1

A plastic waste mixture of polyethylene hollow bottles, polystyrene vessels, polystyrene foams, polyvinyl chloride films, and polyvinyl chloride leathers containing further almost the same amounts of waste woods and papers was crushed into rice-grain forms by means of a crusher and to 100 parts by weight of the grains were added successively a 20 percent solution of 10 parts by weight of the ether-type polyester, an emulsion of 10 parts by weight of polyvinyl acetate, and a 60 percent aqueous solution of 5 parts by weight of an urea resin. The mixture was sufficiently blended and dried at 50°–70°C. By press molding the dried mixture at a temperature of higher than 180°C, sheet-shaped soft solid articles or soft solid boards having various curved surfaces were obtained.

EXAMPLE 2

Waste plastics of polyolefin, polystyrene, polymethacrylate, and reinforced plastics containing some amounts of inorganic matters were crushed into particles smaller than rice grains and after adding to 100 parts by weight of the crushed waste a 50 percent solution of 20 parts by weight of the ether-type polyester, an emulsion of 15 parts by weight of polyvinyl acetate, a solution of 5 parts by weight of a low molecular weight polyolefin, and 15 parts by weight of sodium bicarbonate followed by blending well, the mixture was dried at 50°C to remove water and other solvents completely and molded under a pressure of lower than 20 kg/cm$^2$ at a temperature of higher than 180°C to provide a foamed board.

EXAMPLE 3

A plastic waste mixture containing more than 50 percent polyolefin, other thermoplastic resins, celluloses, and small proportions of clay, wood powder and fibers was crushed into rice-grain form and after adding to 100 parts by weight of the crushed waste mixture a 50 percent solution of 30 parts by weight of an ether-type polyester, an emulsion of 20 parts by weight of an ethylene-vinyl acetate copolymer containing 15 percent vinyl acetate, and a 60 percent solution of 10 parts by weight of urea resin and drying at about 60°C, the mixture was further mixed with 20 parts by weight of sodium bicarbonate powder and molded in a metallic mold at a temperature of lower than 180°C. under a low pressure to provide a semi-soft foamed board.

EXAMPLE 4

A plastic waste mainly consisting of polyolefin and containing other transparent thermoplastic resins was formed into fine pieces by means of a cracker roll and after adding to 100 parts by weight of the fine pieces a 5 percent solution of 20 parts by weight of the ether-type polyester and an emulsion of 10 parts by weight of polyvinyl acetate and blending the mixture sufficiently, the mixture was dried continuously at a temperature of higher than 60°C on a conveyor belt and then rolled by means of a heating roll to provide a transparent or translucent plastic sheet.

EXAMPLE 5

A plastic waste containing 70 percent of a thermoplastic transparent resin and 20 percent of a thermosetting resin was crushed into particles of a size less than rice grains and after adding successively to 100 parts by weight of the crushed plastic waste a 30 percent solution of 10 parts by weight of the ether-type polyester, an emulsion of 30 percent by weight of polyvinyl acetate, a solution of 10 percent by weight of a urea resin, and 30 parts by weight of sodium bicarbonate, blending sufficiently, and drying the mixture at a temperature of lower than 50°C, the mixture was press-molded between metallic plates coated with the ether-type polyester followed by drying to provide a sandwich-type board.

EXAMPLE 6

A mixture of 100 parts by weight of a plastic waste mainly consisting of thermoplastic resins, 20 parts by weight of atactic polypropylene and 20 parts by weight of the ether-type polyester was melted by heating applied to a surface lubricant paper by means of a roll coater and after further coating the plastic-coated surface of the paper with the ether-type polyester, the coated paper was stuck to a carpet by means of a laminator and thereafter the lubricant paper was stripped off to provide a plastic-coated carpet.

What is claimed is:

1. A process for regenerating waste plastic material comprising:
   A. mixing said waste plastic material with (1) a modified polyester prepared by heating polyethylene terephthalate in the presence of a glycol to substitute said glycol for 30 to 100 percent of the repeating ethylene glycol units of said polyethylene terephthalate, said glycol being selected from the group consisting of polymethylene glycols, polyethylene glycols, alkylene glycols and glycols represented by the formula $HOCH_2-X-CH_2OH$ wherein X is an organic group having at least one aromatic ring, with the proviso that said glycol is not ethylene glycol, and (2) at least one member selected from the group consisting of a vinyl acetate homopolymer, an ethylene-vinyl acetate copolymer and a tacky polyolefin selected from the group consisting of a polyolefin having a low polymerization degree and atactic polypropylene, the amount of components (1) and (2), in combination, being effective to adhere said waste plastic material in a moldable form; and
   B. molding the resulting mixture into the desired shape; said plastic being selected from the group consisting of thermoplastic and thermosetting resins.

2. The process of claim 1 wherein said waste plastic material is crushed before said mixing step.

3. The process of claim 1 wherein said plastic is selected from the group consisting of polyethylene, polyvinyl chloride, polystyrene, polymethacrylates, urea resins, melamine resins, phenol resins and cellulose resins.

4. The process of claim 1 wherein said glycol is a polymethylene glycol represented by the formula $HO(CH_2)_nOH$ wherein $n$ varies from 3 to 20.

5. The process of claim 1 wherein said glycol is a polyethylene glycol represented by the formula $HO(CH_2CH_2O)_nOH$ wherein $n$ varies from 2 to 100.

6. The process of claim 1 wherein said glycol is an alkylene glycol selected from the group consisting of propylene glycol, butylene glycol, neopentyl glycol, hexylene glycol, octylene glycol and cyclohexane-1,4-dimethanol.

7. The process of claim 1 wherein X is selected from the group consisting of

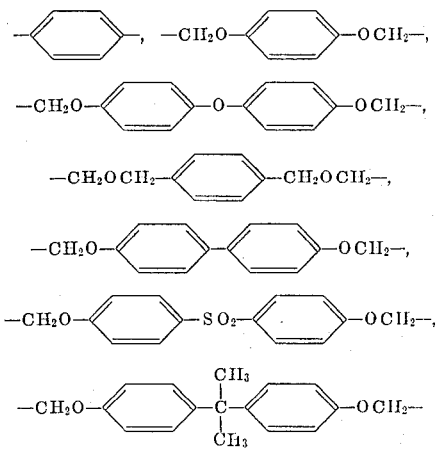

and

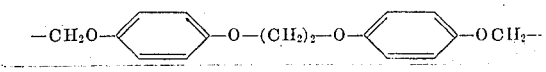

8. The process of claim 1 wherein said waste plastic material is mixed with a foaming agent in addition to said ether-type polyester (1) and said member (2) prior to said molding step.

9. The process of claim 8 wherein said waste plastic material is crushed prior to said mixing step.

10. The process of claim 8 wherein said plastic is selected from the group consisting of polyethylene, polyvinyl chloride, polystyrene, polymethacrylates, urea resins, melamine resins, phenol resins and cellulose resins.

11. The process of claim 1 wherein said plastic is a thermoplastic resin.

12. The process of claim 1 wherein said plastic is a thermosetting resin.

13. The process of claim 2 wherein said crushing is to render said waste plastic material into particulate form.

14. The process of claim 1 wherein the ratio of component to component (2), on a parts by weight basis, is 1:1/3 to 3.

15. The process of claim 1 wherein the ratio of component to component (2) expressed as the result of component (1)/component on a parts by weight basis is from 1/3 to 1.5.

* * * * *